H. E. WILKE.
CAR WHEEL.
APPLICATION FILED JULY 31, 1911.
1,067,628.
Patented July 15, 1913.
Fig. 1.
Fig. 2.
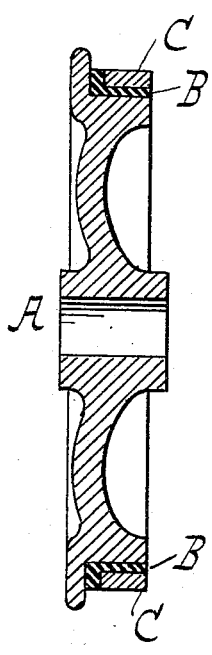
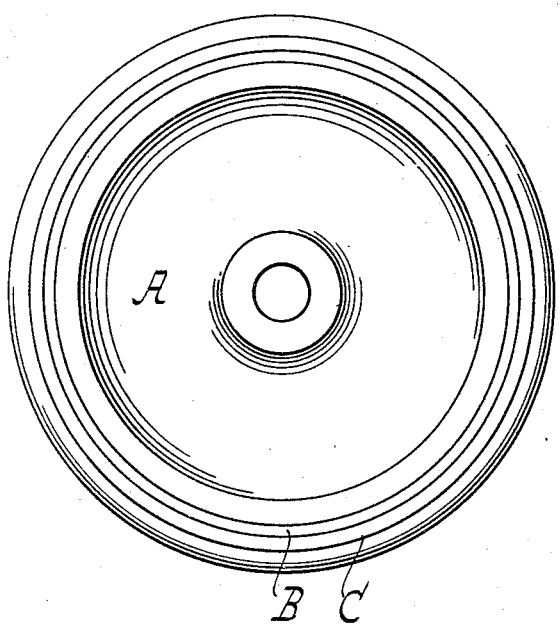
Witnesses:
William Miller
Chris W. Almstaedt
Inventor
Henry E. Wilke
By his Attorneys
Hauff & Warland.

UNITED STATES PATENT OFFICE.

HENRY EMIL WILKE, OF NEW YORK, N. Y.

CAR-WHEEL.

1,067,628.  Specification of Letters Patent.  Patented July 15, 1913.

Application filed July 31, 1911. Serial No. 641,488.

*To all whom it may concern:*

Be it known that I, HENRY EMIL WILKE, a citizen of the United States, residing at No. 273 Cooper street, borough of Brooklyn, county of Kings, city and State of New York, have invented a new and useful Improvement in Car-Wheels.

This invention relates to a car wheel which is provided with a device essentially adapted for deadening sound and diminishing the force of concussion.

The invention contemplates a noiseless cushion wheel which when applied to a railroad car and running on a steel rail especially on an elevated structure is rendered wholly noiseless.

The car wheel may be of ordinary make the rim thereof being equipped with an annular cushion adapted to be clamped by means of a steel tire to the wheel. The cushion is interposed between the rim of the wheel and the steel tire and it has a flange so that it will readily take up lateral as well as tangential impacts.

The novel features of the invention being more fully described in the following specification and claims and illustrated in the accompanying drawing in which—

Figure 1 represents a transverse section of a wheel embodying this invention. Fig. 2 is a side elevation of the same.

In this drawing the letter A designates a car wheel which is cast in one piece including a rim with projecting flange, all of which is well known. On the rim of the wheel is located an annular cushion B which is provided with a flange resting against the side of the wheel flange. A metallic tire C is adapted to clamp the cushion to the rim of the wheel. This tire is jammed over the rim of the cushion while red hot so that it will contract when cool and thus be secured to the wheel.

As shown in the drawing the cushion has a flange which is in contact with the side of the wheel flange and thereby absorbs lateral impacts. The outer rim of the flange also forms a portion of the tread or bearing surface of the wheel. It will be seen that the cushion can be applied to any ordinary wheel and it is designed to obviate noise as well as take up shocks.

The tire when in place engages the rim and flange of the cushion thus preventing lateral and centrifugal movement of the cushion. The cushion may consist of fiber, leather, asbestos or any noise absorbing material and when interposed on the wheel as shown with a portion in contact with the rim and flange of the wheel it deadens sound and diminishes the force of concussion.

I claim:

1. The combination with a flanged wheel, of a cushion arranged on the rim of the wheel and provided with an annular projecting flange to constitute a portion of the tread of the wheel, a tire located on the cushion the periphery of the tire being flush with the circumference of the flanged tread portion of the cushion.

2. The combination with a flanged wheel, of an annular cushion, L-shaped in cross section arranged on the rim of and adapted to form a portion of the tread of the wheel, a tire located on the cushion the periphery of the tire being in line with the tread portion of the cushion.

HENRY EMIL WILKE.

Witnesses:
JENNIE STONE,
E. REICHARD.

---

Copies of this patent may be obtained for five cents each, by addressing the "Commissioner of Patents, Washington, D. C."